United States Patent [19]

Reesman et al.

[11] 4,049,840

[45] Sept. 20, 1977

[54] PROCESS FOR PREPARING AN EXPANDED SOY PRODUCT

[75] Inventors: Stanley H. Reesman; Charles R. Eldred, both of Battle Creek, Mich.

[73] Assignee: General Foods Corporation, White Plains, N.Y.

[21] Appl. No.: 611,592

[22] Filed: Sept. 8, 1975

Related U.S. Application Data

[63] Continuation of Ser. No. 189,735, Oct. 15, 1971, abandoned.

[51] Int. Cl.$^2$ .............................................. A23L 1/20
[52] U.S. Cl. .................................. 426/634; 426/448; 426/618
[58] Field of Search ............... 426/618, 621, 449, 450, 426/560, 569, 634

[56] References Cited

U.S. PATENT DOCUMENTS

| 2,421,216 | 5/1947 | Penty | 426/621 |
|---|---|---|---|
| 3,554,763 | 1/1971 | Jast et al. | 426/449 |
| 3,580,728 | 5/1971 | Gulstad et al. | 426/449 |
| 3,814,824 | 6/1974 | Bedenk et al. | 426/621 |

OTHER PUBLICATIONS

Altschul, Processed Plant Protein Foodshafts, Academic Press, New York, 1958, pp. 413–414.

*Primary Examiner*—Raymond N. Jones
*Assistant Examiner*—Robert J. Warden
*Attorney, Agent, or Firm*—T. J. Carvis; D. J. Donovan; B. P. Struzzi

[57] ABSTRACT

Soy products having a reduced soy flavor are produced by blending, heating and puffing a mixture of a soy product, semolina, water and a sulfur compound.

1 Claim, No Drawings

PROCESS FOR PREPARING AN EXPANDED SOY PRODUCT

This is a continuation of application Ser. No. 189,735, filed Oct. 15, 1971 now abandoned.

BACKGROUND OF THE INVENTION

Soy is one of the least expensive sources of food grade vegetable protein. Soy flour, soy protein isolates, soy grits, soy flakes, soy meal and the like have long been incorporated into foods such as ready to eat and other breakfast cereals, bread formulations, snack products, soup and gravy mixes, meat loaf, protein and carbohydrate containing animal food and the like.

More recently, soy has found increasing use in the preparation of protein food products simulating meat in texture and appearance. For example, U.S. Pat. No. 3,537,859 discloses a process whereby a mixture comprising soy meal, fat and water is extruded to form a porous extrudate resembling bacon in texture and appearance. U.S. Pat. No. 3,488,770 discloses the preparation of expanded soy protein food having the texture of cooked meat when rehydrated. According to U.S. Pat. No. 3,496,858, a fibrous, meat like protein food is prepared by extruding under high pressure a mixture comprising soy meal and minor amounts of sulfur or a sulfur compound.

One of the major disadvantages with the use of soy in human or animal food is the bitter or beany flavor and aroma characteristics of soy. Expanded soy processed with reactants such as sulfur or sulfur compounds has the added disadvantage of slight sulfur odor or off-flavor. Thus, the amount of such soy products that can be incorporated into a given food is limited by the natural or processed soybean flavor; the higher the soy content, the less palatable the food.

There have been many attempts to reduce the disagreeable soy flavor or odor such as by heating soybeans either dry or with steam or by adding materials such as yeast to the soy prior to processing. While some of these techniques are effective to some extent, further improvement is desirable.

It is an object of this invention to prepare a palatable soy food wherein the disagreeable soy flavor and odor is markedly reduced.

SUMMARY OF THE INVENTION

It has now been found that the undesirable off-flavors associated with soy or soy-sulfur products is markedly reduced by incorporating semolina into the soy prior to cooking or otherwise heat treating the soy.

The soy food products encompassed within the scope of this invention are those containing any natural or processed soy. The soy being treated may include raw, cooked or debittered soybeans, soy grits, soy flakes, soy meal, soy flour, soy protein isolates and concentrates, and the like. The soy may be defatted or not.

Semolina is a well known product of commerce, most frequently used as an ingredient in macaroni, spaghetti or vermicelli. It may be characterized as a bland, granular, yellowish flour prepared by grinding and bolting cleaned durum wheat. It is generally of a fineness such that it passes through a 20 U.S. mesh sieve, but not more than about 3% by weight passes through a 100 U.S. mesh sieve. The moisture content of raw semolina is usually less than 15% by weight.

The debittered soy of the present invention is prepared by blending or otherwise admixing the semolina with the soy to form an intimate admixture. Where the soy is in the form of a flour, grit or meal, the mixing may be carried out in a ribbon mixer, hobart mixer or other similar device. Mixing may be also carried out by metering the appropriate amount of the semolina with the soy in a mixer extruder such as is employed in the manufacture of cereals snack items, expanded soy products and the like.

The debittering effect of the semolina upon the soy is not a mere masking of the soy flavor by the semolina, but these ingredients interact to produce a flavor characteristic unlike the bland flavor of semolina or the bitter flavor of soy. In order for this interaction or flavor development to occur, it is necessary that the mixture be subject to a heat treatment step such as toasting, deep fat frying, cooker extrusion or the like. The temperature of such heat treatment step can range from about 180° F. up to the degradation temperature of the material being treated.

DETAILED DESCRIPTION OF THE INVENTION

The quantity of semolina that is mixed with soy prior to cooking the soy containing composition may be regulated to give mixtures having various degrees of flavor and protein value. It has been found that as little as 1% by weight semolina based on soy gives rise to a soy product having detectably decreased bitterness. Generally speaking, the flavor of soy is best enhanced with semolina present at a level of from about 1 to 50% by weight, based on the soy/semolina mixture. Best results in terms of product palatability occur when the semolina is present at the 5 to 25% level.

As indicated above, the present invention is applicable to any food containing soy as an ingredient. In the case of cereals, snack items and other foods based on farinaceous or amylaceous components, all of the ingredients including the soy and semolina may be mixed and processed simultaneously.

Soy products simulating meat in texture may be prepared by mixing the soy and semolina and other ingredients such as sulfur or a sulfur compound, flavorings and the like, and subjecting the mixture to heat processing or heat extrusion as is well known in the art. Typical sulfur compounds which may be employed are sulfur, alkali metal sulfites, bisulfites, metabisulfites and the like, or organic sulfur compounds such as cysteine and methionine, all of which aid in the production of an expanded, porous extrudate having structural integrity and a meat like structure as is known in the art. The temperature reached by the material during extrusion will be at least 250° F. and generally in the range of 270° to 320° F.

The following examples are illustrative of the invention:

EXAMPLE I

An expanded protein product utilizing soy flour and containing about 12% semolina based on soy is prepared as follows:

A mix containing 87.75% de-fatted soy meal, 10.0% semolina flour, 2.0% salt and 0.25% sulfur is dry blended until homogeneous. The above mix was fed into a Wenger X-25 5 barrel extruder at the rate of about 400 lbs./hr. along with a stream of water sufficient to produce an extrudate having a moisture content of about 30%. Using about 60 psig. steam in the jacket of the extruder, the mix is subject to mechanical working and cooking as it moves toward the die head. The mix at a product temperature of about 290° F. is extruded through die openings of 11/32 inch in diameter and discharged into the atmosphere.

The expanded extrudate is then cut into small chunks and dried in an electric oven at 250° F. for 15 minutes until the moisture content was in the range of about 11–12%. The dried chunks are subsequently ground in a Bauer Mill to a particle size of about 1/32 inch.

EXAMPLE II

An expanded protein product is prepared according to the process of Example I except the semolina is not included in the formula.

The expanded protein containing about 97.75% soy, 2% salt and 0.25% sulfur is cut, dried and ground as in Example I.

EXAMPLE III

A conventional animal food based on ground whole chicken, poultry meal and corn flour was prepared. The ground expanded soy pieces of Example I were thoroughly mixed with one portion of the animal food at about 10% by weight; the pieces of Example II were similarly mixed with a second portion of the animal food at the same weight level.

Cat feeding studies revealed a decided preference for the animal food containing the soy/semolina pieces of Example I as opposed to the animal food containing the soy pieces of Example II.

EXAMPLE IV

Low fat snacks are prepared using the following ingredients:

|  | Test | Control |
| --- | --- | --- |
| Wheat Gluten | 52.0% | 52.0% |
| Soy Meal | 37.2% | 46.2% |
| Semolina | 9.0% | — |
| Sodium Metabisulfite | 0.3% | 0.3% |
| Salt | 1.5% | 1.5% |

The ingredients of each sample are blended and mixed with water to produce a mix with about 25% moisture content. Each mix is then processed through a Wenger X-25 extruder as in Example I. The expanded products having moisture contents of about 20% are dried to a moisture content of about 6%.

The bitter, beany flavor of the soy was evident in the control sample but hardly detectable in the test sample containing semolina.

EXAMPLE V

Basic cereal formulations are prepared using the following ingredients:

|  | Test | Control |
| --- | --- | --- |
| Corn Flour | 74.0% | 79.0% |
| Malt Syrup | 6.0% | 6.0% |
| Sucrose | 2.5% | 2.5% |
| Salt | 2.5% | 2.5% |
| Soy Isolate (Promine D) | 10.0% | 10.0% |
| Semolina | 5.0% | — |

The ingredients of each sample are blended and water is added to adjust the moisture content to about 30%. The mixture is extruded into ropes and heated for 15 minutes in an autoclave using 14 psig. pressure. The dough is then blended in a sigma blade mixer, cut, pressed into flakes, dried and toasted at 190° C. for about one minute.

The soy flavor of the test sample containing the semolina was considered much less objectionable as compared with the control sample containing no semolina.

The soy/semolina mixtue of the present invention may be used in any food composition where soy or soy products have been used in the past, such as cereals, bread, meat containing or simulating foods and the like. Such foods may also contain flavor additives, colorants, nutritional additives, and other conventional ingredients. Hydrated soy products simulating meat in texture, such as are prepared according to Example I, may be rendered bacteriologically stable by incorporating therein about 10 to 30% by weight of a saccharide, salt or polyhydric alcohol having 3–8 carbon atoms. These additives may be blended with the soy/semolina mixture piror to extrusion or infused subsequent to extrusion.

What we claim is:

1. A process for preparing an expanded soy product simulating meat in texture and having a reduced soy flavor, which comprises:

blending a soy mixture comprising soy, from about 1 to about 50% semolina based on the combined weight of soy and semolina, water, and a sulfur compound in an amount sufficient to aid expansion;

heating and mechanically working the soy mixture under pressure, the heating being sufficient in degree to cook the soy and raise the temperature to at least 250° up to 320° F; and extruding the soy mixture to effect expansion of the cooked soy mixture.

* * * * *